United States Patent
Wang et al.

(10) Patent No.: US 12,096,444 B2
(45) Date of Patent: Sep. 17, 2024

(54) SCHEDULING METHOD, APPARATUS, BASE STATION, TERMINAL AND COMPUTER READABLE STORAGE MEDIUM

(71) Applicant: DATANG MOBILE COMMUNICATIONS EQUIPMENT CO., LTD., Beijing (CN)

(72) Inventors: Lei Wang, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 695 days.

(21) Appl. No.: 17/266,286

(22) PCT Filed: Aug. 9, 2019

(86) PCT No.: PCT/CN2019/099985
§ 371 (c)(1),
(2) Date: Feb. 5, 2021

(87) PCT Pub. No.: WO2020/030111
PCT Pub. Date: Feb. 13, 2020

(65) Prior Publication Data
US 2021/0307053 A1    Sep. 30, 2021

(30) Foreign Application Priority Data
Aug. 10, 2018    (CN) ................. 201810912080.6

(51) Int. Cl.
*H04W 72/23* (2023.01)
*H04W 72/121* (2023.01)

(52) U.S. Cl.
CPC ......... *H04W 72/23* (2023.01); *H04W 72/121* (2013.01)

(58) Field of Classification Search
CPC ... H04W 72/23; H04W 72/121; H04W 74/04; H04L 1/0041; H04L 1/0057;
(Continued)

(56) References Cited

U.S. PATENT DOCUMENTS

| 11,057,156 B2 * | 7/2021 | Hong ............... H04L 1/0041 |
| 2013/0223366 A1 * | 8/2013 | Papasakellariou .... H04L 5/0007 370/329 |

(Continued)

FOREIGN PATENT DOCUMENTS

| CN | 102791036 A | 11/2012 |
| CN | 102882644 A | 1/2013 |

(Continued)

OTHER PUBLICATIONS

T. Liu, M. Dai, Z. Fei, S. Xia, X. Han and J. Shi, "Group-DCI based scheduling scheme for ultra-reliable and low latency communications," 2017 9th International Conference on Wireless Communications and Signal Processing (WCSP), Nanjing, China, 2017, pp. 1-6, doi: 10.1109/WCSP.2017.8170963. (Year: 2017).*

(Continued)

*Primary Examiner* — Ayaz R Sheikh
*Assistant Examiner* — Tarell A Hampton
(74) *Attorney, Agent, or Firm* — Ladas & Parry, LLP

(57) ABSTRACT

The invention provides a scheduling method, a scheduling apparatus, a base station, a terminal and a computer readable storage medium. The scheduling method includes: scheduling data transmission of at least one terminal through downlink control information by means of combining high layer signaling pre-configuration and group common downlink control channels.

18 Claims, 3 Drawing Sheets

(58) Field of Classification Search
CPC ..... H04L 1/0061; H04L 1/0072; H04L 5/003; H04L 5/001; H04L 5/0055; H04L 5/0053; H04L 5/0094
See application file for complete search history.

(56) References Cited

U.S. PATENT DOCUMENTS

| | | | |
|---|---|---|---|
| 2014/0161084 A1* | 6/2014 | Yang | H04W 72/23 370/329 |
| 2015/0029910 A1* | 1/2015 | He | H04W 36/0072 370/280 |
| 2015/0181572 A1 | 6/2015 | Guo et al. | |
| 2015/0358986 A1 | 12/2015 | Yang et al. | |
| 2016/0066343 A1 | 3/2016 | Lin et al. | |
| 2016/0218832 A1* | 7/2016 | Dabeer | H04L 1/1671 |
| 2016/0219618 A1* | 7/2016 | Rico Alvarino | H04W 72/21 |
| 2017/0302419 A1 | 10/2017 | Liu et al. | |
| 2017/0332365 A1* | 11/2017 | Lin | H04W 72/20 |
| 2017/0367046 A1* | 12/2017 | Papasakellariou | H04L 5/0048 |
| 2018/0167959 A1 | 6/2018 | Liao et al. | |
| 2018/0175983 A1 | 6/2018 | Yum et al. | |
| 2018/0199343 A1* | 7/2018 | Deogun | H04L 5/0044 |
| 2018/0288715 A1* | 10/2018 | Ye | H04L 5/005 |
| 2018/0302926 A1* | 10/2018 | Bhorkar | H04L 5/005 |
| 2019/0306923 A1* | 10/2019 | Xiong | H04J 13/0062 |
| 2020/0022144 A1* | 1/2020 | Papasakellariou | H04W 72/23 |
| 2020/0029315 A1* | 1/2020 | Lin | H04L 1/0075 |
| 2020/0100219 A1* | 3/2020 | Takeda | H04W 72/23 |
| 2020/0229152 A1* | 7/2020 | Park | H04L 5/0094 |
| 2020/0229231 A1* | 7/2020 | Oh | H04W 80/08 |
| 2020/0236697 A1 | 7/2020 | Takeda et al. | |

FOREIGN PATENT DOCUMENTS

| | | |
|---|---|---|
| CN | 103580790 A | 2/2014 |
| CN | 104113924 A | 10/2014 |
| CN | 106900059 A | 6/2017 |
| JP | 2018522474 A | 8/2018 |
| WO | 2014123378 A1 | 8/2014 |
| WO | 2016161881 A1 | 10/2016 |
| WO | 2018056337 A1 | 3/2018 |
| WO | 2018064128 A1 | 4/2018 |

OTHER PUBLICATIONS

CATT, "NR DL control channel design considerations", R1-1608791, 3GPP TSG RAN WG1 #86bis, Lisbon, Portugal Oct. 10-14, 2016, all pages.

Samsung, "Indication of Preempted Resources in DL", R1-1717667, 3GPP TSG RAN WG1 Meeting 90bis, Prague, CZ, Oct. 9-13, 2017, all pages.

Extended European Search Report from EP app. No. 19846454.7, dated Sep. 28, 2021, all pages.

First Office Action for Korean Patent Application 10-2021-7007156 and its English translation provided by foreign associate.

First Office Action for Japanese Patent Application 2021-531170 issued on Apr. 26, 2022 and its English Translation provided by the Global Dossier.

Second Office Action for Korean Patent Application 10-2021-7007156 issued by the Korean Patent Office on Jun. 28, 2023 and its English translation provided by foreign associate.

"Corrections on Multiplexing Data with Different Transmission Durations," 3GPP TSG RAN WG1 Meeting #92 R1-1801986, Athens, Greece, Feb. 26-Mar. 2, 2018, Agenda Item: 7.1.3.3.6, Source: Samsung, all pages.

"Contents for Group-common PDCCH", R1-1712445, 3GPP TSG RAN WG1 Meeting #90, Prague, Czechia Aug. 21-25, 2017.

"Group DCI for uplink HARQ-ACK feedback", R1-1801926, 3GPP TSG RAN WG1 Meeting #92, Athens, Greece, Feb. 26-Mar. 2, 2018.

International Search Report from PCT/CN2019/099985, dated Oct. 29, 2019, with English translation provided by WIPO.

Written Opinion of the International Searching Authority from PCT/CN2019/099985, dated Oct. 29, 2019, with English translation provided by WIPO.

International Preliminary Report on Patentability from PCT/CN2019/099985, dated Feb. 16, 2021, with English translation provided by WIPO.

First Office Action for Chinese Patent Application 201810912080.6, issued by the Chinese Patent Office on Oct. 10, 2022, and its English Translation provided by Global Dossier.

"On 2-stage Downlink Control Information for NR" 3GPP TSG RAN WG1 Meeting #87 R1-1612121, Reno, USA, Nov. 14-18, 2016, Agenda Item: 7.1.4.1, Source: MediaTek Inc.

First Office Action for Korean Patent Application 9-5-2-099849931 and its English translation provided by foreign associate.

"NR DL scheduling mechanism" 3GPP TSG RAN WG1 Meeting #89 R1-1707508, Hangzhou, P. R. China, May 15-19, 2017, Source: CATT, Agenda Item: 7.1.3.3.1.

"Summary of multiplexing data with different transmission durations" 3GPP TSG RAN WG1 Meeting 90bis, R1-1718820, Prague, CZ, Oct. 9-13, 2017, Agenda Item: 7.3.3.6, Source: vivo.

Office action from corresponding Korean Patent Application No. 10-2021-7007156 dated Dec. 26, 2023.

Huawei et al., R1-1803707, "Remaining issues on DCI contents and formats", 3GPP TSG RAN WG1 #92bis, Sanya, China, Apr. 16-20, 2018 (Apr. 6, 2018).

First Office Action for Korean Patent Application 10-2021-7007156 issued Dec. 20, 2022 and its English translation provided by foreign associate.

* cited by examiner scheduling data transmission of at least one terminal through DCI by means of combining high layer signaling pre-configuration and group common downlink control channels — 11

FIG. 1 receiving N groups of scheduling information configured by first high layer signaling and scheduling indication information included in a bit field related to the terminal in downlink control information (DCI); wherein N is a positive integer greater than or equal to 1 — 21 determining a group of target scheduling information from the N groups of scheduling information according to the scheduling indication information — 22 performing data transmission or knowing that the scheduling is not performed according to the target scheduling information — 23

FIG. 2

SCHEDULING METHOD, APPARATUS, BASE STATION, TERMINAL AND COMPUTER READABLE STORAGE MEDIUM

CROSS-REFERENCE TO RELATED APPLICATIONS

The present application is the U.S. national phase of PCT Application No. PCT/CN2019/099985 filed on Aug. 9, 2019, which claims a priority to the Chinese patent application 201810912080.6 filed on Aug. 10, 2018, the disclosures of which are incorporated herein by reference in their entireties.

TECHNICAL FIELD

The disclosure relates to the technical field of communications, in particular to a scheduling method, a scheduling apparatus, a base station, a terminal, and a computer readable storage medium.

BACKGROUND

A terminal detects downlink control information (DCI) for receiving scheduling data in a common search space (CSS) or a user equipment specific search space (USS), wherein the DCI includes complete scheduling information, i.e. the scheduling information of different terminals is respectively carried by different physical downlink control channels (PDCCHs). And the terminal receives or sends the data according to the received DCI related to the terminal itself.

However, in the system in the related art, data transmission scheduling information of the terminal can only be sent through the DCI carried on the physical layer channel PDCCH. Unicast data of different terminals is scheduled through different DCIs, which need to be carried through different PDCCH candidates. When the number of terminals needing to be scheduled simultaneously in the system is large, PDCCHs of different terminals can collide, so that the DCI of some terminals can hardly be sent successfully, the time delay of the system is increased, and the system performance is affected adversely. Especially for services with high reliability and low delay, the downlink control channel often use transmission with a larger aggregation level to ensure more robust transmission, resulting in increased collision probability and eventually increased scheduling delay. How to reduce the resource collision probability of the system on the premise of increasing the PDCCH reliability is not clear at present.

That is, in the system of the related art, the control information for scheduling data is included in the DCI, that is, the DCI needs to contain complete scheduling information. However, when the system bandwidth is limited and the number of terminals to be scheduled is large, per UE scheduling will cause the PDCCH collision probability of different terminals to increase, resulting in the increase of scheduling delay. There is no clear solution to solve the problem in the art.

SUMMARY

The disclosure aims to provide a scheduling method, a scheduling apparatus, a base station, a terminal, and a computer readable storage medium, and solves the problem that the PDCCH collision probability of the different terminals is increased when the number of the terminals to be scheduled is large in the related art.

In order to solve the above technical problem, the embodiment of the present disclosure provides a scheduling method applied to a base station, including:
  scheduling data transmission of at least one terminal through downlink control information (DCI) by means of combining high layer signaling pre-configuration and group common downlink control channels.

Alternatively, the scheduling the data transmission of at least one terminal through the downlink control information (DCI) by means of combining high layer signaling pre-configuration and group common downlink control channel, including:
  configuring N groups of scheduling information respectively for Y terminals in advance through different first high layer signaling, and sending the scheduling information to corresponding terminals respectively, wherein Y is a positive integer greater than or equal to 1, N is a positive integer greater than or equal to 1, and the first high layer signaling corresponding to different terminals is different;
  and transmitting the DCI carried by the downlink control channel to Z terminals in a common search space, wherein the DCI includes bit fields respectively related to the Z terminals, wherein the scheduling indication information in each bit field indicates that a corresponding terminal transmits data according to one of the received N groups of scheduling information or indicates that the terminal is not scheduled; wherein Z is a positive integer greater than or equal to 1 and less than or equal to Y.

Alternatively, each group of scheduling information includes complete information for scheduling; or
  each group of scheduling information includes incomplete information for scheduling in the complete information for scheduling, and the residual scheduling information are determined in a predefined manner or configured in advance through second higher layer signaling or dynamically indicated through physical layer signaling.

Alternatively, each group of scheduling information is different from each other.

Alternatively, the scheduling the data transmission of at least one terminal through the downlink control information (DCI) by means of combining high layer signaling pre-configuration and group common downlink control channel further including:
  configuring index of the information bit used for corresponding terminal data scheduling in the DCI through different third high layer signaling respectively;
  the third higher layer signaling corresponding to different terminals is different.

Alternatively, the periodicity of the common search space is less than one time slot.

Alternatively, the DCI is transmitted by reusing currently defined downlink control information format (DCI format) or using a newly added DCI format.

Alternatively, if the currently defined DCI format is reused, the base station indicates that one currently defined DCI format is used for transmitting the scheduling information of the Z terminals through a predetermined flag, and the bit field of the Z terminals is included in the DCI format.

Alternatively, the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

Alternatively, if the newly added DCI format is adopted, the DCI format includes the bit fields of the Z terminals, and each bit field is used for scheduling the predetermined terminal;

a relationship between the bit field and the predetermined terminal is determined by the bit field index indicated by the third higher layer signaling;

and a payload size of the DCI format is the same as a payload size of DCI format 0-0 or DCI format 1-0 determined according to an initial band width part (BWP).

Alternatively, a number M of the bit fields included in the DCI is determined according to the X bits in the DCI that is used for transmitting the scheduling indication information and the length L of each bit field, M=Floor (X/L), wherein X is a positive number greater than 0, and L is a positive number greater than 0.

Alternatively, the length of each bit field in the DCI is determined according to the number of the scheduling information.

Alternatively, if each group of scheduling information includes complete information for scheduling, N kinds of different scheduling information are configured;

then the length of each bit field in the DCI is ceil (log 2(N)) bits or ceil(log 2(N+1)) bits.

Alternatively, if each group of scheduling information includes incomplete information for scheduling in the complete information for scheduling, then the bit field in the DCI indicates the scheduling information configured by the first higher layer signaling, and dynamically indicates the residual scheduling information;

and the residual scheduling information is information which is not included by each group of scheduling information.

The embodiment of the disclosure also provides a scheduling method which is applied to a terminal and includes the following steps:

receiving N groups of scheduling information configured by first high layer signaling and scheduling indication information included in a bit field related to the terminal in downlink control information (DCI); wherein N is a positive integer greater than or equal to 1;

determining a group of target scheduling information from the N groups of scheduling information according to the scheduling indication information;

and performing data transmission or indicating that the scheduling is not performed according to the target scheduling information.

Alternatively, each group of scheduling information includes complete information for scheduling; or each group of scheduling information includes incomplete information for scheduling in the complete information for scheduling, and residual scheduling information are determined in a predefined manner or configured in advance through second higher layer signaling or dynamically indicated through physical layer signaling.

Alternatively, each group of scheduling information is different from each other.

Alternatively, the receiving the N groups of the scheduling information configured by the first high layer signaling and scheduling indication information included in the bit field related to the terminal in the downlink control information (DCI) includes:

receiving the N groups of scheduling information configured by the first high layer signaling, the DCI of bit fields related to the Z terminals, and indexes of the scheduling indication information for the terminal data scheduling in the DCI, which are indicated through the third high layer signaling;

and wherein Z is a positive integer greater than or equal to 1 and less than or equal to Y; Y is a total number of terminals configured with the N groups of scheduling information by the base station.

Alternatively, the receiving the N groups of the scheduling information configured by the first high layer signaling and scheduling indication information included in the bit field related to the terminal in the downlink control information (DCI) includes:

obtaining the bit field used for corresponding terminal data scheduling in the DCI according to the index of the bit field configured by the third higher layer signaling.

Alternatively, the receiving the N groups of the scheduling information configured by the first high layer signaling and scheduling indication information included in the bit field related to the terminal in the downlink control information (DCI) includes:

detecting and receiving the DCI including the scheduling indication information of the Z terminals according to physical downlink control channel (PDCCH) monitoring occasion configured by the base station;

and wherein Z is a positive integer greater than or equal to 1 and less than or equal to Y; Y is the total number of terminals configured with the N groups of scheduling information by the base station.

Alternatively, the format of the DCI is a currently defined downlink control information format (DCI format), or DCI format added for the scheduling of the Z terminals;

and wherein Z is a positive integer greater than or equal to 1 and less than or equal to Y; Y is the total number of terminals configured with the N groups of scheduling information by the base station.

The embodiment of the present disclosure also provides a base station including a memory, a processor, and a computer program stored on the memory and operable on the processor; wherein the processor implements the following steps when executing the program:

scheduling data transmission of at least one terminal through downlink control information (DCI) by means of combining high layer signaling pre-configuration and group common downlink control channels.

Alternatively, the processor is configured to:

configure N groups of scheduling information respectively for the Y terminals in advance through different first high layer signaling, and send the scheduling information to corresponding terminals respectively, wherein Y is a positive integer greater than or equal to 1, N is a positive integer greater than or equal to 1, and the first high layer signaling corresponding to different terminals is different;

and transmit the DCI carried by the downlink control channel to Z terminals in a common search space, wherein the DCI includes bit fields respectively related to the Z terminals, wherein the scheduling indication information in each bit field indicates that a corresponding terminal transmits data according to one of the received N groups of scheduling information or indicates that the terminal is not scheduled; wherein Z is a positive integer greater than or equal to 1 and less than or equal to Y.

Alternatively, each group of scheduling information includes complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Alternatively, each group of scheduling information is different from each other.

Alternatively, the processor is also configured to:

indicate indexes of the scheduling indication information used for corresponding terminal data scheduling in the bit field in the DCI through different third high layer signaling respectively;

and the third higher layer signaling corresponding to different terminals is different.

Alternatively, the periodicity of the common search space is less than one time slot.

Alternatively, the DCI is transmitted by reusing currently defined downlink control information format (DCI format) or using a newly added DCI format.

Alternatively, if the currently defined DCI format is reused, the base station indicates that one currently defined DCI format is used for transmitting the scheduling information of the Z terminals through a predetermined flag, and the bit field of the Z terminals is included in the DCI format.

Alternatively, the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

Alternatively, if the newly added DCI format is adopted, the DCI format includes the bit fields of the Z terminals, and each bit field is used for scheduling the predetermined terminal;

a relationship between the bit field and the predetermined terminal is determined by the bit field index indicated by the third higher layer signaling;

and a payload size of the DCI format is the same as a payload size of DCI format 0-0 or DCI format 1-0 determined according to an initial band width part (BWP).

Alternatively, a number M of the bit fields included in the DCI is determined according to the X bits in the DCI that is used for transmitting the scheduling indication information and the length L of each bit field, M=Floor (X/L), wherein X is a positive number greater than 0 and L is a positive number greater than 0.

Alternatively, the length of each bit field in the DCI is determined according to the number of the scheduling information.

Alternatively, if each group of scheduling information includes complete information for scheduling, N kinds of different scheduling information are configured;

then the length of each bit field in the DCI is ceil (log 2(N)) bits or ceil (log 2(N+1)) bits.

Alternatively, if each group of scheduling information includes incomplete information for scheduling in the complete information for scheduling, then the bit field in the DCI indicates the scheduling information configured by the first higher layer signaling, and dynamically indicates the residual scheduling information;

and wherein the residual scheduling information is information which is not included by each group of scheduling information.

The embodiment of the present disclosure also provide a terminal, comprising a memory, a processor, a transceiver, and a computer program stored on the memory and operable on the processor; wherein the processor implements the following steps when executing the program:

receiving N groups of scheduling information configured by first high layer signaling and scheduling indication information included in a bit field related to the terminal in downlink control information (DCI) by the transceiver; wherein N is a positive integer greater than or equal to 1;

determining a group of target scheduling information from the N groups of scheduling information according to the scheduling indication information;

and performing data transmission or indicating that the scheduling is not performed according to the target scheduling information.

Alternatively, each group of scheduling information includes complete information for scheduling; or each group of scheduling information includes incomplete information for scheduling in the complete information for scheduling, and residual scheduling information are determined in a predefined manner or configured in advance through second higher layer signaling or dynamically indicated through physical layer signaling.

Alternatively, each group of scheduling information is different from each other.

Alternatively, the processor is configured to:

receive the N groups of scheduling information configured by the first high layer signaling, the DCI of bit fields related to the Z terminals, and indexes of the scheduling indication information for the terminal data scheduling in the DCI, which are indicated through the third high layer signaling;

and wherein Z is a positive integer greater than or equal to 1 and less than or equal to Y; Y is a total number of terminals configured with the N groups of scheduling information by the base station.

Alternatively, the processor is configured to:

obtain the scheduling indication information for terminal data scheduling in a corresponding bit field in the DCI according to the index of the bit field indicated by the third higher layer signaling.

Alternatively, the processor is configured to:

detect and receive the DCI including the scheduling indication information of the Z terminals according to physical downlink control channel (PDCCH) monitoring occasion configured by the base station;

and wherein Z is a positive integer greater than or equal to 1 and less than or equal to Y; Y is the total number of terminals configured with the N groups of scheduling information by the base station.

Alternatively, the format of the DCI is a currently defined downlink control information format (DCI format), or DCI format added for the scheduling of the Z terminals;

and wherein Z is a positive integer greater than or equal to 1 and less than or equal to Y; Y is the total number of terminals configured with the N groups of scheduling information by the base station.

The embodiment of the present disclosure also provides a computer readable storage medium having stored thereon the computer program which, when executed by the processor, implements the steps of the scheduling method described above.

The embodiment of the disclosure also provides a scheduling apparatus, which is applied to the base station and includes:
 a first processing module, which is configured to schedule the data transmission of at least one terminal through the downlink control information (DCI) by means of combining high layer signaling pre-configuration and group common downlink control channel.

Alternatively, the first processing module includes:
 a first processing submodule, which is configured to configure N groups of scheduling information respectively for Y terminals in advance through different first high layer signaling, and sending the scheduling information to corresponding terminals respectively, wherein Y is a positive integer greater than or equal to 1, N is a positive integer greater than or equal to 1, and the first high layer signaling corresponding to different terminals is different; and
 a second processing submodule, which is configured to transmit the DCI carried by the downlink control channel to Z terminals in a common search space, wherein the DCI includes bit fields respectively related to the Z terminals, wherein the scheduling indication information in each bit field indicates that a corresponding terminal transmits data according to one of the received N groups of scheduling information or indicates that the terminal is not scheduled; wherein Z is a positive integer greater than or equal to 1 and less than or equal to Y.

Alternatively, each group of scheduling information includes complete information for scheduling; or
 each group of scheduling information includes incomplete information for scheduling in the complete information for scheduling, and the residual scheduling information are determined in a predefined manner or configured in advance through second higher layer signaling or dynamically indicated through physical layer signaling.

Alternatively, each group of scheduling information is different from each other.

Alternatively, the first processing module also includes:
 a third processing submodule, which is configured to indicate the indexes of the scheduling indication information used for corresponding terminal data scheduling in the bit field in the DCI through different third high layer signaling respectively;
 and the third higher layer signaling corresponding to different terminals is different.

Alternatively, the periodicity of the common search space is less than one time slot.

Alternatively, the DCI is transmitted by reusing currently defined downlink control information format (DCI format) or using a newly added DCI format.

Alternatively, if the currently defined DCI format is reused, the base station indicates that one currently defined DCI format is used for transmitting the scheduling information of the Z terminals through a predetermined flag, and the bit field of the Z terminals is included in the DCI format.

Alternatively, the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

Alternatively, if the newly added DCI format is adopted, the DCI format includes the bit fields of the Z terminals, and each bit field is used for scheduling the predetermined terminal;
 a relationship between the bit field and the predetermined terminal is determined by the bit field index indicated by the third higher layer signaling;
 and a payload size of the DCI format is the same as a payload size of DCI format 0-0 or DCI format 1-0 determined according to an initial band width part (BWP).

Alternatively, a number M of the bit fields included in the DCI is determined according to the X bits in the DCI that is used for transmitting the scheduling indication information and the length L of each bit field, M=Floor (X/L), wherein X is a positive number greater than 0 and L is a positive number greater than 0.

Alternatively, the length of each bit field in the DCI is determined according to the number of the scheduling information.

Alternatively, if each group of scheduling information includes complete information for scheduling, N kinds of different scheduling information are configured;
 then the length of each bit field in the DCI is ceil (log 2(N)) bits or ceil (log 2(N+1)) bits.

Alternatively, if each group of scheduling information includes incomplete information for scheduling in the complete information for scheduling, then the bit field in the DCI indicates the scheduling information configured by the first higher layer signaling, and dynamically indicates the residual scheduling information;
 and the residual scheduling information is information which is not included by each group of scheduling information.

The embodiment of the disclosure also provides a scheduling apparatus, which is applied to a terminal and includes:
 a first receiving module, which is configured to receive N groups of scheduling information configured by the first high layer signaling and scheduling indication information included in a bit field related to the terminal in downlink control information (DCI); wherein N is a positive integer greater than or equal to 1;
 a first determination module is configured to determine a group of target scheduling information from the N groups of scheduling information according to the scheduling indication information;
 a second processing module, which is configured to perform data transmission or indicate that the scheduling is not performed according to the target scheduling information.

Alternatively, each group of scheduling information includes complete information for scheduling; or
 each group of scheduling information includes incomplete information for scheduling in the complete information for scheduling, and residual scheduling information are determined in a predefined manner or configured in advance through second higher layer signaling or dynamically indicated through physical layer signaling.

Alternatively, each group of scheduling information is different from each other.

Alternatively, the first receiving module includes:
a fourth processing submodule, which is configured to receive the N groups of scheduling information configured by the first high layer signaling, the DCI of bit fields related to the Z terminals, and indexes of the scheduling indication information for the terminal data scheduling in the DCI, which are indicated through the third high layer signaling;
and wherein Z is a positive integer greater than or equal to 1 and less than or equal to Y; Y is the total number of terminals configured with the N groups of scheduling information by the base station.

Alternatively, the first receiving module includes:
a fifth processing submodule, which is configured to obtain the scheduling indication information for terminal data scheduling in a corresponding bit field in the DCI according to the index of the bit field indicated by the third higher layer signaling.

Alternatively, the first receiving module includes:
a sixth processing submodule, which is configured to detect and receive the DCI including the scheduling indication information of the Z terminals according to PDCCH monitoring occasion configured by the base station;
and wherein Z is a positive integer greater than or equal to 1 and less than or equal to Y; Y is the total number of terminals configured with the N groups of scheduling information by the base station.

Alternatively, the format of the DCI is a currently defined downlink control information format (DCI format), or DCI format added for the scheduling of the Z terminals;
and wherein Z is a positive integer greater than or equal to 1 and less than or equal to Y; Y is the total number of terminals configured with the N groups of scheduling information by the base station.

Advantageous effects of the above technical solutions of the present disclosure are as follows:

In the above solutions, the scheduling method schedules the data transmission of at least one terminal through the downlink control information (DCI) by means of combining high layer signaling pre-configuration and group common downlink control channel; that is, the base station configures scheduling information through the higher layer signaling, and then notifies the terminal of the corresponding scheduling information through a UE-specific bit field in the DCI; and the resource overhead of downlink control channels can be reduced, the collision probability among the downlink control channels of different terminals can be reduced, and the transmission delay can be reduced.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

FIG. 1 is a schematic flow diagram of a scheduling method according to an embodiment of the present disclosure;

FIG. 2 is another schematic flow diagram of a scheduling method according to an embodiment of the present disclosure;

DETAILED DESCRIPTION

Figure 3:
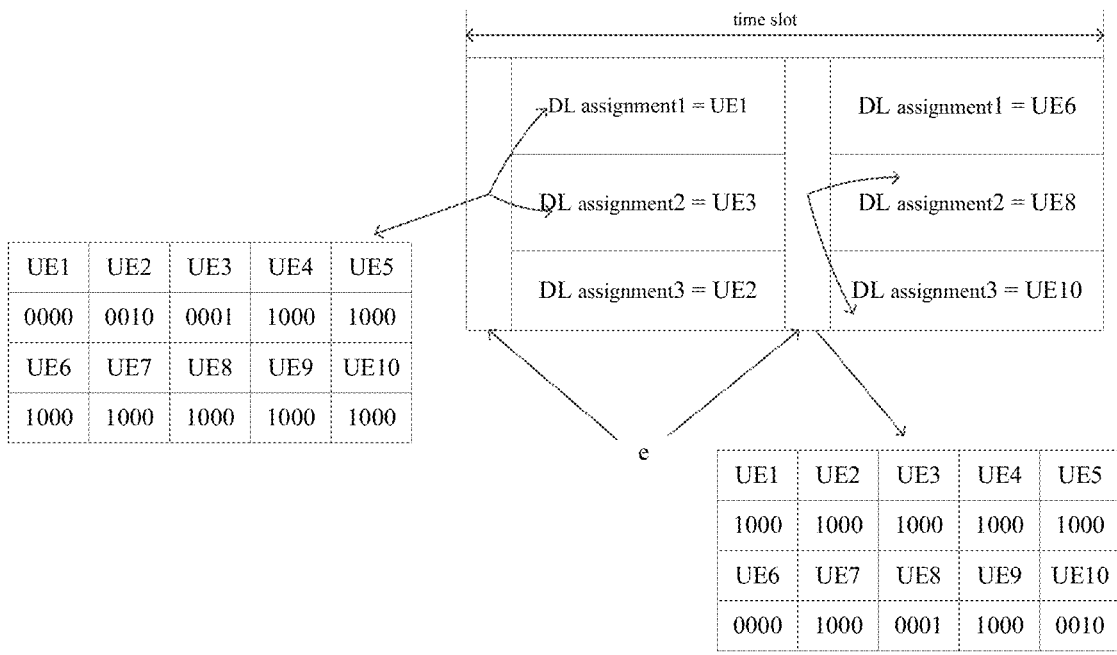
FIG. 3 is a schematic diagram of the implementation of a scheduling method according to an embodiment of the present disclosure.

In order that the technical problems to be solved by the present disclosure, its technical solutions and advantages will be more clearly understood, a detailed description will be given below with reference to the accompanying drawings and specific embodiments.

Aiming at the problem that the PDCCH collision probability of different terminals is increased when the number of terminals to be scheduled is large in the related art, the present disclosure provides a scheduling method, which is applied to a base station and including following steps:
step 11: scheduling data transmission of at least one terminal through downlink control information (DCI) by means of combining high layer signaling pre-configuration and group common downlink control channel.

According to the embodiment of the disclosure, the scheduling method schedules the data transmission of at least one terminal through the DCI by means of combining high layer signaling pre-configuration and group common downlink control channel; that is, the base station configures scheduling information through the higher layer signaling, and then notifies the terminal of the corresponding scheduling information through the UE-specific bit field in the DCI; and the resource overhead of the downlink control channels can be reduced, the collision probability among the downlink control channels of different terminals can be reduced, and the transmission delay can be reduced.

Specifically, the scheduling the data transmission of at least one terminal through the DCI by means of combining high layer signaling pre-configuration and group common downlink control channel, includes: configuring N groups of scheduling information respectively for a number Y of terminals in advance through different first high layer signaling, and sending the scheduling information to corresponding terminals respectively, wherein Y is a positive integer greater than or equal to 1, N is a positive integer greater than or equal to 1, and the first high layer signaling corresponding to different terminals is different; and transmitting the DCI carried by the downlink control channel to Z terminals in a common search space, the DCI includes bit fields respectively related to the Z terminals, wherein the scheduling indication information in each bit field indicates that a corresponding terminal transmits data according to one of the received N groups of scheduling information or indicates that the terminal is not scheduled; wherein Z is a positive integer greater than or equal to 1 and less than or equal to Y.

Herein, each group of the scheduling information includes complete information for scheduling; or each group of scheduling information includes incomplete information for scheduling in the complete information for scheduling, and residual scheduling information are determined in a predefined manner or configured in advance through second higher layer signaling or dynamically indicated through physical layer signaling.

Each group of scheduling information is different from each other.

Furthermore, the scheduling the data transmission of at least one terminal through the downlink control information (DCI) by means of combining high layer signaling pre-configuration and group common downlink control channel further includes: configuring index of the information bit used for corresponding terminal data scheduling in the DCI through different third high layer signaling respectively; and the third higher layer signaling corresponding to the different terminals is different.

Herein, the bit field index may be specifically the bit field number; and it is not limited thereto.

In the embodiments of the disclosure, the periodicity for the common search space may be less than one time slot.

Specifically, the DCI is transmitted by reusing the currently defined downlink control information format (DCI format) or using a newly added DCI format:

(1) if the currently defined DCI format is reused, the base station indicates that one currently defined DCI format is used for transmitting the scheduling information of the Z terminals through a predetermined flag, and the bit fields of the Z terminals are included in the DCI format. Herein, a length of the DCI is the same as a length of the reused DCI in the current bandwidth part (BWP), i.e. the length of the reused DCI is not changed.

Herein the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

(2) if the newly added DCI format is adopted, the DCI format includes the bit fields of the Z terminals, and each bit field is used for scheduling the predetermined terminal; a relationship between the bit field and the predetermined terminal is determined by the bit field index indicated by the third higher layer signaling; and a payload size of the DCI format is the same as the payload size of DCI format 0-0 or DCI format 1-0 determined according to an initial band width part (BWP).

In the embodiment of the disclosure, a number M of the bit fields included in the DCI is determined according to the bit length X in the DCI that can be used for transmitting the scheduling indication information and a length L of each bit field, M=Floor (X/L), wherein X is a positive number greater than 0 and L is a positive number greater than 0.

The length of each bit field in the DCI is determined according to the number of the scheduling information.

Herein, if each group of scheduling information includes complete information for scheduling, N kinds of different scheduling information are configured, then the length of each bit field in the DCI is ceil (log 2(N)) bits or ceil (log 2(N+1)) bits.

If each group of scheduling information includes incomplete information for scheduling in the complete information for scheduling, the bit field in the DCI indicates the scheduling information configured by the first higher layer signaling and can dynamically indicate the residual scheduling information; and the residual scheduling information is information which is not included by each group of scheduling information.

Here, the related higher layer signaling in the embodiment of the disclosure, may be a user equipment specific radio resource control signaling (UE-specific RRC signaling); but this is not intended to be limiting.

The scheduling method of the base station side is mainly used for indicating a terminal to perform data scheduling according to the scheduling information configured by the high layer signaling.

The embodiment of the disclosure also provides a scheduling method applied to a terminal, as shown in FIG. 2, including:

step 21: receiving N groups of the scheduling information configured by the first high layer signaling and scheduling indication information included in the bit field related to the terminal in the DCI; wherein N is a positive integer greater than or equal to 1;

step 22: determining a group of target scheduling information from the N groups of scheduling information according to the scheduling indication information; and step 23: performing data transmission or indicating that the scheduling is not performed according to the target scheduling information.

The scheduling method provided by the embodiment of the disclosure, including: receiving N groups of the scheduling information configured by the first high layer signaling and scheduling indication information included in the bit field related to the terminal in the DCI; wherein N is a positive integer greater than or equal to 1; determining a group of target scheduling information from the N groups of scheduling information according to the scheduling indication information; performing data transmission or indicating that the scheduling is not performed according to the target scheduling information; the scheduling the data transmission of at least one terminal through the DCI by means of combining high layer signaling pre-configuration and group common downlink control channel; that is, the base station configures scheduling information through the higher layer signaling, and then notifies the terminal of the corresponding scheduling information through the UE-specific bit field in the DCI; so that the resource overhead of the downlink control channels can be reduced, the collision probability among the downlink control channels of different terminals can be reduced, and the transmission delay can be reduced.

Herein, each group of the scheduling information includes the complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Each group of scheduling information is different from each other.

Specifically, the receiving the N groups of the scheduling information configured by the first high layer signaling and scheduling indication information included in the bit field related to the terminal in the DCI includes: receiving the N groups of scheduling information configured by the first high layer signaling, the DCI of bit fields related to the Z terminals, and indexes of the scheduling indication information for the terminal data scheduling in the DCI, which are indicated through the third high layer signaling; wherein Z is a positive integer greater than or equal to 1 and less than or equal to Y; and Y is a total number of terminals configured with the N groups of scheduling information by the base station.

On the other hand, the receiving the N groups of the scheduling information configured by the first high layer signaling and scheduling indication information included in the bit field related to the terminal in the DCI includes: obtaining the scheduling indication information for terminal data scheduling in a corresponding bit field in the DCI according to the index of the bit field indicated by the third higher layer signaling.

Specifically, the receiving the N groups of the scheduling information configured by the first high layer signaling and scheduling indication information included in the bit field related to the terminal in the DCI includes: detecting and receiving the DCI including the scheduling indication information of the Z terminals according to the PDCCH monitoring occasion configured by the base station; wherein Z is a positive integer greater than or equal to 1 and less than or equal to Y; and Y is the total number of terminals configured with the N groups of scheduling information by the base station.

In the embodiment of the disclosure, the format of the DCI is a currently defined downlink control information format (DCI format), or DCI format added for the scheduling of the Z terminals; wherein Z is a positive integer greater than or equal to 1 and less than or equal to Y; and Y is the total number of terminals configured with the N groups of scheduling information by the base station.

The scheduling method provided by the embodiments of the disclosure is further described below in conjunction with both the base station and the terminal.

Aiming at the technical problem, the embodiment of the disclosure provides a scheduling method, mainly including: the base station schedules the data transmission of at least one terminal through one DCI by means of combining the high layer signaling and the physical layer signaling; that is, the base station configures scheduling information through higher layer signaling, and then notifies the terminal of the corresponding scheduling information through the UE-specific bit field in the DCI; that is, the base station configures scheduling information through the higher layer signaling, and then notifies the terminal of the corresponding scheduling information through the UE-specific bit field in the DCI.

Herein, the base station side mainly includes: the base station respectively configures the N groups of scheduling information for at least one terminal (assuming that the number is Y, which is a positive integer larger than or equal to 1) through the different high layer signaling (such as RRC signaling), wherein N is a positive integer larger than or equal to 1; and the base station transmits the downlink control information carried by the downlink control channel in the common search space to indicate that Z (Z is a positive integer greater than or equal to 1, and is less than or equal to Y) terminals respectively transmit (send or receive) data according to a certain group of the N groups of scheduling information corresponding to the terminals.

Specifically:

First part: the base station pre-configures N groups of scheduling information for the Y terminals through different first higher layer signaling (e.g. RRC signaling) respectively; the first higher layer signaling corresponding to the different terminals is different;

wherein, (1) each group of the scheduling information may include the complete scheduling information (which may also be referred to as the complete information for scheduling), such as time-frequency domain resource allocation, modulation and coding strategy (MCS), antenna port correlation configuration, and a hybrid automatic repeat request process-identification (HARQ process ID), etc.

Alternatively, each group of the scheduling information includes the partial scheduling information (the incomplete information for scheduling in the complete information for scheduling), and the other scheduling information (residual scheduling information) is determined in a predefined manner or configured in advance through the second higher layer signaling or dynamically indicated through the physical layer signaling.

(2) Each group of scheduling information configured by the higher layer signaling is different from each other;

Furthermore, the base station can respectively indicate indexes of the scheduling indication information for the corresponding terminal data scheduling in the bit field of the DCI through the different third higher layer signaling. The third higher layer signaling corresponding to different terminals is different.

Second part: the base station sends the scheduling information indication of the Z terminals through an L1 signaling (the downlink control information DCI carried on the PDCCH).

Herein, (1) the PDCCH carrying the scheduling information of the Z terminals is sent in the common search space (CSS); and the periodicity of the search space may be less than one time slot, that is, the PDCCH can be transmitted on any downlink symbol within one time slot.

(2) the downlink control information (DCI) is transmitted by reusing the currently defined DCI format or introducing the new DCI format.

a. if the current DCI format is reused, the base station indicates through a predetermined flag that when the certain current DCI format is used for transmitting the scheduling information of the Z terminals, the DCI includes the bit fields (also referred to as the scheduling indication bit fields) of the Z terminals, and the length of the DCI is the same as that of the reused DCI in the current BWP;

the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI;

b. if the new DCI format is introduced, the DCI includes the bit fields of the Z terminals, each bit field being used for scheduling of a specific terminal, the interrelationship of which is determined by the bit field index of the terminal indicated by the third higher layer signaling. The length of the DCI is the same as the size (length) of the DCI format 0-0 or the DCI format 1-0 determined according to the initial BWP.

(3) the length of each bit field in the DCI is determined according to the number of the scheduling information configured by the first high layer signaling.

a. if the first higher layer signaling configures all information needed for the data scheduling (if each group of the scheduling information includes the complete information for scheduling), e.g. N kinds of different scheduling information are configured, the length of each bit field in the DCI is ceil (log 2(N)) bits or ceil (log 2(N+1)) bits;

b. if the first higher layer signaling configures the part of the information required for the data scheduling (if each group of scheduling information includes incomplete information for scheduling in the complete information for scheduling), the bit field in the DCI indicates the scheduling information configured by the first higher layer signaling and can dynamically indicate the residual scheduling information (the residual scheduling information), the other required scheduling information (the residual scheduling information) may be pre-configured by the second higher layer signaling, and need not be indicated by the L1 signaling;

for the above two situation, e.g. the first higher layer signaling configures two time-frequency domain resource allocations, four hybrid automatic repeat request processes (HARD processes), then the length of each bit field is ceil (log 2 (4×2+1)) bits for indicating the combination of the HARQ process and the time-frequency domain resource allocation used by the base station when scheduling the data transmission of the terminal, an additional state may indicate that the terminal is not scheduled.

The combination of the various sub information in the scheduling information may be arbitrary and is not limited to the combination of the various sub information in the scheduling information as above. For example, the first higher layer signaling configures two time-frequency resource allocations, the four HARQ processes, a new data indicator (NDI) related to retransmission, and a redundancy version (RV), then the length of each bit field is ceil (log 2(4×2×2×4+1))=7 bits for indicating the combination of the resource allocation (RA), the HARQ process, the NDI, and the RV used by the base station in scheduling data transmission of the terminal. Ceil means rounding up.

(4) the number M of the bit fields included in the DCI is determined according to the bit length X in the DCI that can be used for transmitting the scheduling indication information and the length L of each bit field, M=Floor (X/L), wherein X is a positive number greater than 0 and L is a positive number greater than 0. Floor means rounding down.

Terminal side: the terminal mainly determines how to receive a transmission data channel (for data transmission) according to the scheduling information configured by the first high layer signaling (such as RRC signaling) and the scheduling indication information related to the terminal in DCI.

Specifically:

First part: receiving N groups of scheduling information configured by first high layer signaling, wherein the scheduling information includes the DCI of bit fields related to the Z terminals, and indexes of the scheduling indication information for the terminal data scheduling, which is indicated through the third high layer signaling, in the bit fields in the DCI; wherein Z is a positive integer greater than or equal to 1 and less than or equal to Y; and Y is the total number of terminals configured with the N groups of scheduling information by the base station.

Specifically including: the terminal receives the user equipment specific radio resource control signaling (UE-specific RRC signaling) sent by the base station, and obtains various kinds of scheduling information and the number of the bit field for transmitting the scheduling indication information of the terminal.

Furthermore, the terminal can obtain the scheduling indication information in the corresponding bit field according to the bit field number notified by the third higher layer signaling;

then the terminal determines how to receive or send data thereof according to the scheduling indication information and the scheduling information configured by the first high layer signaling.

Wherein, each group of the scheduling information includes the complete information for scheduling;

each group of scheduling information includes the incomplete information for scheduling in the complete information for scheduling, and the residual scheduling information are determined in the predefined manner or configured in advance through the second higher layer signaling.

Alternatively, each group of scheduling information is different from each other.

Second part: the terminal can detect and receive the DCI of the scheduling indication information of the Z terminals on the PDCCH monitoring occasion configured by the base station.

The DCI format is the currently defined DCI format, or the entirely new DCI format introduced for the Z terminal scheduling.

Herein Z is a positive integer greater than or equal to 1 and less than or equal to Y; and Y is the total number of terminals configured with the N groups of scheduling information by the base station.

The scheduling method provided by the embodiments of the present disclosure is exemplified below.

Example 1: it is assumed that the base station configures the N groups of the scheduling information for the plurality of terminals (assuming Y is a positive integer greater than or equal to 1) through the RRC signaling respectively, wherein N is a positive integer greater than or equal to 1. Each type of the scheduling information includes the complete scheduling information such as the frequency domain resource allocation, the time domain resource allocation, the MCS, the HARQ related information, and MIMO related information, etc. Different groups of the scheduling information include the different content. For example, the frequency domain resource of the scheduling information group 1 is the frequency domain resource allocation 1 (FRA 1), the time domain resource is the time domain resource allocation (TRA) 1, the MCS1, the HARQ process ID=1, and the antenna port used for transmission is the antenna port (AP) 1. The frequency domain resources of the scheduling information group 2 are FRA2, the time domain resources are TRA2, the MCS2, the HARQ process ID=2, and the antenna port used is the AP2; and so on. Meanwhile, the base station notifies the bit field number indicating the terminal scheduling information in the DCI in the terminal specific RRC signaling, e.g., the scheduling information of the UE1 is notified through the indication information in the first bit field in the DCI.

The DCI for scheduling terminal data transmission includes the scheduling indication information for a plurality of terminals (assuming Z, Z is a positive integer greater than or equal to 1 and less than or equal to Y). The different bit fields in the DCI are used for scheduling the data transmissions for the different terminals and are transmitted in the common search space (CSS). The terminal detects and receives the DCI at the determined time domain position according to a monitoring period configured by the base station, and in order to reduce the time delay, the monitoring period of the search space for transmitting the DCI can be less than one time slot, for example, the interval between two monitoring positions is Q orthogonal frequency division reusing (OFDM) symbols, wherein Q is an integer greater than or equal to 0. In order not to increase the number of additional blind checks, the payload size of the DCI is the same size as the other fallback DCI formats transmitted in the CSS.

Specifically, assuming that the base station configures N=8 groups of the scheduling information for the Y terminals, the length of each bit field in the corresponding DCI carrying the scheduling indication information of the Z terminals is ceil (log 2 (8+1))=4 bits. Assuming that the fallback DCI size transmitted in the CSS is 41 bits, the payload size at the DCI format X (representing the newly introduced DCI format) is also 41 bits, which includes 10 bit fields of length having 4 bits.

Specifically, N=8 kinds of different scheduling information notified by the base station can be configured in a table means; each row of the table may represent one of the scheduling information; for example, the base station configuration table is:

| scheduling information index (scheduling information indication) | scheduling information |
| --- | --- |
| 0000 | complete scheduling information 1 |
| 0001 | complete scheduling information 2 |
| 0010 | complete scheduling information 3 |
| 0011 | complete scheduling information 4 |
| 0100 | complete scheduling information 5 |
| 0101 | complete scheduling information 6 |
| 0110 | complete scheduling information 7 |
| 0111 | complete scheduling information 8 |
| 1000 | the terminal is not scheduled at the current time |
| 1001-1111 | predetermined |

It is assumed that the bit field index configured by the base station for the terminal UE1 is 1, that is, after the terminal detects and receives the DCI for scheduling the group of terminals, the scheduling information is determined according to the first bit field in the DCI. For example, the indication bit in the bit field is 0000, and the terminal transmits or receives data according to the complete scheduling information 1 configured by the base station; as another example, the indication bit in the bit field is 1000, which means that the terminal UE1 is not scheduled at the current moment and the UE1 neither transmits nor receives data.

As shown in FIG. 3, the DCI (including the scheduling indication information of the terminals UE1-UE10) for scheduling data transmission of a group of terminals is transmitted in the two PDCCH monitoring occasion in one slot. The DCI sent in the first PDCCH monitoring occasion shown in FIG. 3 schedules the data reception of the terminals UE1, UE2 and UE3, i.e. UE1 obtains its downlink scheduling DL assignment information according to the scheduling indication information contained in its corresponding bit field in the DCI and receives data according to this information, and for UE2 and UE3 in a similar manner. The other terminals (UE4-UE10) are not scheduled at this moment. The DCI sent in the second PDCCH monitoring occasion as shown schedules the terminals UE6, UE8 and UE10 that receive data according to DL assignments 1, 2, 3 indicated in their respective bit fields, respectively. Reference "e" in the figure shows the search space monitoring occasions.

Example 2: for the example 1, the length of each UE-specific bit field in the DCI carrying the scheduling indication information of the Z terminals transmitted in the common search space is determined by ceil (log$_2$(N)), wherein N is the number (number of groups) of the different scheduling information configured by the base station through the first higher layer signaling. For example, N=7, then the length of each UE-specific bit field in the DCI is 3 bits. When the base station indicates that the base station does not have the configured scheduling information index or the predetermined table row index (array index) through the scheduling indication information corresponding to the UE-specific bit field, the terminal is not scheduled at the current moment.

Example 3: as described with respect to the examples 1 and 2, the number of the different scheduling information configured by the base station through RRC signaling is not limited, e.g. the number of the different scheduling information configured by the base station through the RRC signaling may be greater than the number of terminals scheduled through the same DCI.

Example 4: as described with respect to examples 1 and 3, the DCI format used to transmit the scheduling indication information for the group of terminals may be the currently defined DCI format. The base station may indicate through certain indication information (the predetermined flag) that the bit field in the DCI is defined as the content defined in the current 212 protocol or the content of scheduling information for the scheduling different terminals. Specific methods include, but are not limited to:

when the CRC added by the DCI is scrambled using the specific RNTI, the DCI includes the bit fields for scheduling the Z terminals, and each bit field is used for scheduling data transmission of the specific terminal in combination with scheduling information configured by the first higher layer signaling;

when the information carried on the frozen bits after the DCI is subjected to polarization code polar coding indicates that the bit field for scheduling the Z terminals is included in the DCI, each bit field is used for scheduling data transmission of the specific terminal in combination with scheduling information configured by the first high layer signaling;

when certain bit fields in the DCI are set to invalid values, the DCI includes the bit fields for scheduling the Z terminals, and each bit field is used in conjunction with the scheduling information configured by the first higher layer signaling to schedule data transmissions for the particular terminal;

when DCI is transmitted in some specific search space, e.g. a higher layer configures the DCI format 0-0 or the DCI format 1-0 transmitted in the search space with the specific number for the scheduling data transmission of the Z terminals, each bit field in combination with the scheduling information configured by the first higher layer signaling for scheduling data transmission of the specific terminal;

adding the explicit indication field indicating the DCI application scenario in the currently defined DCI format for indicating the specific use of the DCI. For example, a 1-bit bit field is introduced, with 0 indicating that the DCI is used for regular scheduling and 1 indicating that the DCI is used for scheduling data transmission of the Z terminals.

Example 5: It is assumed that the base station configures part of the information required for scheduling for the terminal through RRC signaling, such as configuring the plurality of time-frequency domain resource allocations, configuring the plurality of MCSs, and configuring the plurality of possible transmission ports, etc. Furthermore, the base station schedules Z terminals over a DCI transmitted in a common search space, and each bit field in the DCI is used to indicate scheduling information for different terminals.

The scheduling indication information corresponding to each bit field in the DCI can indicate different scheduling information configured by the first higher layer signaling.

It is assumed that the base station is configured with two different sets of time-frequency domain resource allocation, two different MCS levels, and other scheduling information are all one (i.e. fixed through second higher layer signaling); then the length of each bit field in the DCI is ceil (log 2(2×2))=2 bits, indicating different combinations of the time-frequency resource allocation and the MCS used by the terminal data transmission. In this example, where the time-frequency domain resource allocations {RA1, RA2} and MCS {MCS1, MCS2} include four different combinations, then the different information states of the 2 bits indication information represent different scheduling policies. For example, 00 indicates RA1+MCS1, 01 indicates RA1+MCS2, 10 indicates RA2+MCS1, and 11 indicates RA2+MCS2. Of course, the length of each bit field may be 3 bits and the residual state is used to indicate that the terminal is not scheduled at the current time.

Furthermore, each bit field in the DCI carried by the PDCCH transmitted in the CSS may include more content. For example, if retransmission needs to be supported, retransmission related information such as the HARQ ID, NDI, RV, etc. may be carried in each bit field. Based on this example, the length of each bit field is ceil ($\log_2(2\times2\times4\times2\times2)$)=6 bits; that is, each bit field may be only 64 different scheduling combinations. Furthermore, the length of the bit field may be 7 bits and the residual bit status is used to indicate the situation where the terminal is not scheduled at that moment.

Among them, the configuration method of the RRC signaling, the corresponding relationship between the different bit fields in the DCI and the terminal, and the transmission method of the DCI can be implemented according to the relevant contents of the Example 1, which will not be described in detail.

Example 6: the method described with respect to Examples 1-5 may be used for both uplink and downlink data scheduling, and is not limited thereto.

It can be seen from the above that the solutions provided by the embodiment of the present disclosure is mainly:

The base station schedules data transmission for multiple terminals simultaneously through one DCI by means of the combination of the high layer signaling (RRC signaling) pre-configuration and the group common downlink control channels;

The terminal receives the scheduling information configured by the higher layer signaling (RRC signaling) and the information contained in the bit field associated with itself within the DCI to determine how to transmit the data;

Therefore, the resource overhead of the downlink control channel can be reduced, the collision probability among the downlink control channels of different terminals is favorably reduced, and the transmission delay is reduced.

The embodiment of the present disclosure also provide the base station including a memory, a processor, and a computer program stored on the memory and operable on the processor; wherein the processor implements the following steps when executing the program:

scheduling data transmission of at least one terminal through downlink control information (DCI) by means of combining high layer signaling pre-configuration and group common downlink control channels.

The base station provided by the embodiment of the present disclosure schedules the data transmission of at least one terminal through one downlink control information (DCI) by means of combining high layer signaling pre-configuration with the group common downlink control channel, that is, the base station configures scheduling information through high layer signaling and then notifies the terminal of corresponding scheduling information through a terminal specific bit field in the DCI; the resource overhead of the downlink control channels can be reduced, the collision probability among the downlink control channels of different terminals can be reduced, and the transmission delay can be reduced.

Figure 4:
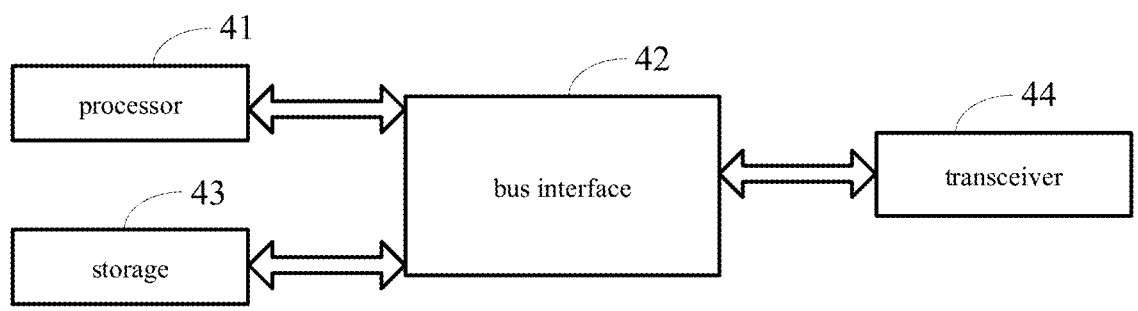
FIG. 4 is a structure diagram of a base station according to an embodiment of the present disclosure.

Specifically, as shown in FIG. 4, the base station of the embodiment of the disclosure includes:

a processor 41; and a memory 43 connected to the processor 41 through a bus interface 42, wherein the memory 43 is used for storing programs and data used by the processor 41 when executing operations, and when the processor 41 calls and executes the programs and data stored in the memory 43, the following processes are executed:

scheduling the data transmission of at least one terminal through the downlink control information (DCI) by means of combining high layer signaling pre-configuration and group common downlink control channel.

The base station in the embodiment of the disclosure may also include a transceiver 44 without limitation.

Herein, a transceiver 44 is connected to the bus interface 42 for receiving and transmitting data under the control of the processor 41.

It should be noted that in FIG. 4, the bus architecture may include any number of interconnected buses and bridges, particularly one or more processors represented by the processor 41 and various circuits of the memory represented by the memory 43 linked together. The bus architecture may also link the various other circuits, such as peripheral devices, voltage regulators, power management circuits, etc. as is well known in the art, and therefore will not be described further herein. The bus interface provides an interface. The transceiver 44 may be a number of elements, including a transmitter and a transceiver, providing units for communicating with various other devices over a transmission medium. The processor 41 is responsible for managing the bus architecture and general processing, and the memory 43 may store data used by the processor 41 in performing operations.

It will be appreciated by those skilled in the art that all or part of the steps for implementing the embodiments described above may be performed by means of hardware, and that the associated hardware may also be indicated by a computer program comprising instructions for performing some or all of the steps of the methods described above; the computer program may be stored in the readable storage medium, which may be any form of storage medium.

Specifically, the processor is configured to: configure N groups of scheduling information respectively for the Y terminals in advance through different first high layer signaling, and send the scheduling information to corresponding terminals respectively, wherein Y is a positive integer greater than or equal to 1, N is a positive integer greater than or equal to 1, and the first high layer signaling corresponding to different terminals is different; and transmit the DCI carried by the downlink control channel to Z terminals in a common search space, the DCI includes bit fields respectively related to the Z terminals, wherein the scheduling indication information in each bit field indicates that a corresponding terminal transmits data according to one of the received N groups of scheduling information or indicates that the terminal is not scheduled; wherein Z is a positive integer greater than or equal to 1 and less than or equal to Y.

Herein, each group of the scheduling information includes the complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Each group of scheduling information is different from each other.

Furthermore, the processor is also configured to: indicate indexes of the scheduling indication information used for corresponding terminal data scheduling in the bit field in the DCI through different third high layer signaling respectively; and the third higher layer signaling corresponding to the different terminals is different.

In the embodiment of the disclosure, the periodicity for the common search space may be less than one time slot.

Specifically, the DCI is transmitted by reusing the currently defined downlink control information format (DCI format) or using a newly added DCI format:

(1) if the currently defined DCI format is reused, the base station indicates that one currently defined DCI format is used for transmitting the scheduling information of the Z terminals through a predetermined flag, and the bit field of the Z terminals is included in the DCI format.

Herein, the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

(2) if the newly added DCI format is adopted, the DCI format includes the bit fields of the Z terminals, and each bit field is used for scheduling the predetermined terminal; a relationship between the bit field and the predetermined terminal is determined by the bit field index indicated by the third higher layer signaling; and a payload size of the DCI format is the same as a payload size of DCI format 0-0 or DCI format 1-0 determined according to an initial band width part (BWP).

In the embodiment of the disclosure, a number M of the bit fields included in the DCI is determined according to the X bits in the DCI that can be used for transmitting the scheduling indication information and the length L of each bit field, M=Floor (X/L), wherein X is a positive number greater than 0, and L is a positive number greater than 0.

The length of each bit field in the DCI is determined according to the number of the scheduling information.

Wherein, if each group of scheduling information includes complete information for scheduling, N kinds of different scheduling information are configured; and then the length of each bit field in the DCI is ceil (log 2(N)) bits or ceil (log 2(N+1)) bits.

if each group of scheduling information includes incomplete information for scheduling in the complete information for scheduling, the bit field in the DCI indicates the scheduling information configured by the first higher layer signaling and can dynamically indicate the residual scheduling information; and the residual scheduling information is information which is not included by each group of scheduling information.

Wherein, the embodiments of the scheduling method of the terminal side are suitable for the embodiment of the base station, and the same technical effect can be achieved.

The embodiment of the present disclosure also provides a terminal, comprising a memory, a processor, a transceiver, and a computer program stored on the memory and operable on the processor; wherein the processor implements the following steps when executing the program:

receiving N groups of the scheduling information configured by first high layer signaling and scheduling indication information included in a bit field related to the terminal in the downlink control information DCI by the transceiver; wherein N is a positive integer greater than or equal to 1; determining a group of target scheduling information from the N groups of scheduling information according to the scheduling indication information; and performing data transmission or indicating that the scheduling is not performed according to the target scheduling information.

The terminal provided by the embodiment of the disclosure receives the N groups of the scheduling information configured by the first high layer signaling and scheduling indication information included in the bit field related to the terminal in the downlink control information DCI; wherein N is a positive integer greater than or equal to 1; determining a group of target scheduling information from the N groups of scheduling information according to the scheduling indication information; performing data transmission or obtaining that the scheduling is not performed according to the target scheduling information; the scheduling the data transmission of at least one terminal through the downlink control information (DCI) by means of combining high layer signaling pre-configuration and group common downlink control channel; that is, the base station configures scheduling information through the higher layer signaling, and then notifies the terminal of the corresponding scheduling information through the UE-specific bit field in the DCI; so that the resource overhead of the downlink control channels can be reduced, the collision probability among the downlink control channels of different terminals can be reduced, and the transmission delay can be reduced.

Figure 5:
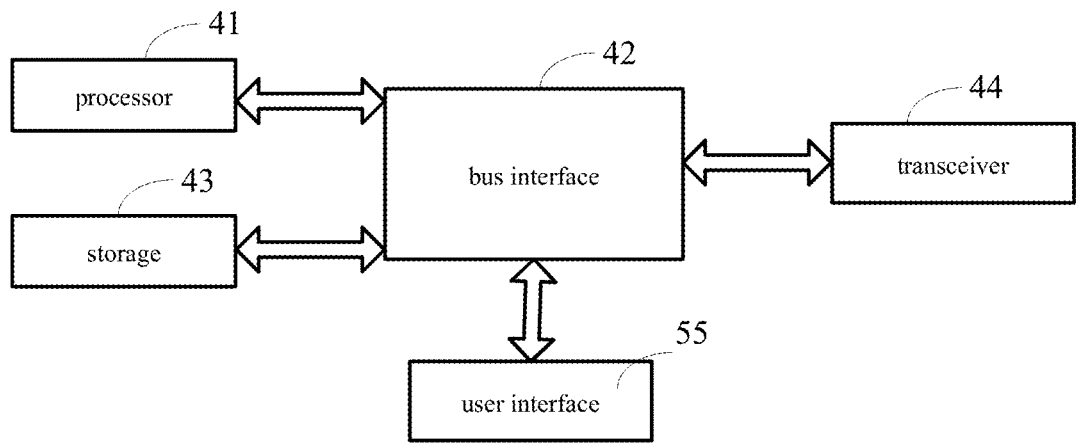
FIG. 5 is a structure diagram of a terminal according to an embodiment of the present disclosure.

Specifically, as shown in FIG. 5, the terminal provided by the embodiment of the disclosure includes:

the processor 51; and a memory 53 connected to the processor 51 through a bus interface 52, wherein the memory 53 is used for storing programs and data used by the processor 51 when executing operations, and when the processor 51 calls and executes the programs and data stored in the memory 53, the following processes are executed:

receiving the N sets of scheduling information configured by the first higher layer signaling and the scheduling indication information included in the bit fields associated with the terminals within the downlink control information DCI by the transceiver 54; wherein N is the positive integer greater than or equal to 1;

determining a group of target scheduling information from the N groups of scheduling information according to the scheduling indication information;

and performing data transmission or obtaining that the scheduling is not performed according to the target scheduling information.

Wherein, a transceiver 54 is connected to the bus interface 52 for receiving and transmitting data under the control of the processor 51.

It should be noted that in FIG. 5, the bus architecture may include any number of interconnected buses and bridges, particularly one or more processors represented by the processor 51 and various circuits of the memory represented by the memory 53 linked together. The bus architecture may also link the various other circuits, such as peripheral devices, voltage regulators, power management circuits, etc. as is well known in the art, and therefore will not be described further herein. The bus interface provides the interface. The transceiver 54 may be a number of elements, including a transmitter and a transceiver, providing units for communicating with various other devices over a transmission medium. For different terminals, the user interface 55 may also be an interface capable of externally interfacing with desired devices including, but not limited to, a keypad, a display, a speaker, a microphone, and a joystick, etc. The processor 51 is responsible for managing the bus architecture and the general processing and the memory 53 may store data used by the processor 51 in performing operations.

It will be appreciated by those skilled in the art that all or part of the steps for implementing the embodiments described above may be performed by means of hardware, and that the associated hardware may also be indicated by a computer program comprising instructions for performing some or all of the steps of the methods described above; the computer program may be stored in the readable storage medium, which may be any form of storage medium.

Wherein, each group of the scheduling information includes the complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Each group of scheduling information is different from each other.

In particular, the processor is configured to: receiving the N groups of scheduling information configured by the first high layer signaling, the DCI of bit fields related to the Z terminals, and indexes of the scheduling indication information for the terminal data scheduling in the DCI, which are indicated through the third high layer signaling; wherein Z is a positive integer greater than or equal to 1 and less than or equal to Y; Y is the total number of terminals configured with N groups of scheduling information by the base station; and wherein, Z is the positive integer greater than or equal to 1 and less than or equal to Y; and Y is the total number of terminals configured with the N groups of scheduling information by the base station.

In another aspect, the processor is configured to: obtain the scheduling indication information for terminal data scheduling in a corresponding bit field in the DCI according to the index of the bit field indicated by the third higher layer signaling.

In particular, the processor is configured to: detect and receive the DCI including the scheduling indication information of the Z terminals according to the PDCCH monitoring occasion configured by the base station; wherein, Z is a positive integer greater than or equal to 1 and less than or equal to Y; and Y is the total number of terminals configured with the N groups of scheduling information by the base station.

In the embodiment of the disclosure, the format of the DCI is the currently defined downlink control information format (DCI format), or DCI format added for the scheduling of the Z terminals; wherein, Z is a positive integer greater than or equal to 1 and less than or equal to Y; and Y is the total number of terminals configured with the N groups of scheduling information by the base station.

Wherein, the embodiments of the scheduling method of the terminal side are suitable for the embodiment of the terminal, and the same technical effect can be achieved.

The embodiment of the disclosure also provide a computer readable storage medium having stored thereon a computer program which, when executed by the processor, implements the steps of the scheduling method at the base station side; or the program is executed by the processor to realize the steps of the scheduling method of the terminal side.

Wherein, the embodiments of the scheduling method of the base station side or the terminal side are suitable for the embodiment of the computer readable storage medium, and the corresponding same technical effects can be achieved.

Figure 6:
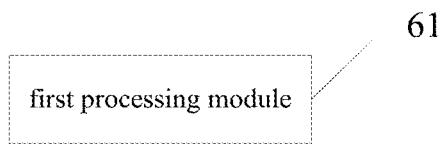
FIG. 6 is a schematic diagram of a scheduling apparatus according to an embodiment of the present disclosure.

The embodiment of the disclosure also provides a scheduling apparatus applied to the base station, as shown in FIG. 6, including:

a first processing module 61, which is used for scheduling the data transmission of at least one terminal through the downlink control information (DCI) by means of combining high layer signaling pre-configuration and group common downlink control channel.

According to the embodiment of the disclosure, the scheduling apparatus schedules the data transmission of at least one terminal through the downlink control information (DCI) by means of combining high layer signaling pre-configuration and group common downlink control channel; that is, the base station configures scheduling information through the higher layer signaling, and then notifies the terminal of the corresponding scheduling information through the UE-specific bit field in the DCI; and the resource overhead of the downlink control channels can be reduced, the collision probability among the downlink control channels of different terminals can be reduced, and the transmission delay can be reduced.

In particular, the first processing module includes: the first processing submodule is used for respectively configuring the N groups of the scheduling information for the Y terminals in advance through the different first high layer signaling and respectively sending the N groups of scheduling information to the corresponding terminals, wherein Y is the positive integer greater than or equal to 1, N is the positive integer greater than or equal to 1, and the first high layer signaling corresponding to different terminals is different; and the second processing sub-module is used for transmitting the DCI carried by the downlink control channel to the Z terminals in the common search space, the DCI includes the bit fields respectively related to the Z terminals, wherein the scheduling indication information in each bit field indicates that the corresponding terminal transmits data according to one of the N groups of received scheduling information or learns that the DCI is not scheduled; and wherein Z is the positive integer greater than or equal to 1 and less than or equal to Y.

Wherein, each group of the scheduling information includes the complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Each group of scheduling information is different from each other.

Furthermore, the first processing module further includes: a third processing submodule, which is used for respectively indicating the indexes of the scheduling indication information for the corresponding terminal data scheduling in the bit field in the DCI through different third high layer signaling; and the third higher layer signaling corresponding to different terminals is different.

In the embodiment of the disclosure, the periodicity for the common search space may be less than 1 time slot.

Specifically, the DCI is transmitted by reusing the currently defined downlink control information format (DCI format) or using a newly added DCI format:

(1) if the currently defined DCI format is reused, the base station indicates that one currently defined DCI format is used for transmitting the scheduling information of the Z terminals through a predetermined flag, and the bit field of the Z terminals is included in the DCI format.

Herein, the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

(2) if the newly added DCI format is adopted, the DCI format includes the bit fields of the Z terminals, and each bit field is used for scheduling the predetermined terminal; the relationship between the bit field and the predetermined terminal is determined by the bit field index indicated by the third higher layer signaling; and the payload size of the DCI format is the same as the payload size of DCI format 0-0 or DCI format 1-0 determined according to the initial band width part (initial BWP).

In the embodiment of the disclosure, the number M of the bit fields included in the DCI is determined according to the bit length X in the DCI that can be used for transmitting the scheduling indication information and the length L of each bit field, M=Floor (X/L), wherein X is a positive number greater than 0 and the L is a positive number greater than 0.

The length of each bit field in the DCI is determined according to the number of the scheduling information.

Wherein, if each group of scheduling information includes complete information for scheduling, N kinds of different scheduling information are configured; and then the length of each bit field in the DCI is ceil (log 2(N)) bits or ceil (log 2(N+1)) bits.

if each group of scheduling information includes incomplete information for scheduling in the complete information for scheduling, the bit field in the DCI indicates the scheduling information configured by the first higher layer signaling and can dynamically indicate the residual scheduling information; and the residual scheduling information is information which is not included by each group of scheduling information.

Wherein, the embodiments of the scheduling method at the base station side are all applicable to the embodiment of the scheduling device, and the same technical effect can be achieved.

Figure 7:
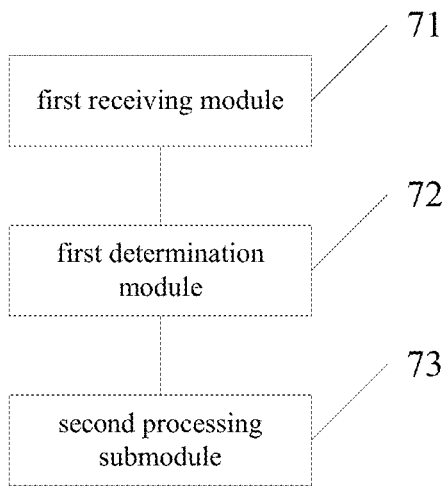
FIG. 7 is another schematic diagram of a scheduling apparatus according to an embodiment of the present disclosure.

The embodiment of the present disclosure also provides a scheduling apparatus applied to the terminal, as shown in FIG. 7, including:

a first receiving module 71 is used for receiving the N sets of scheduling information configured by the first higher layer signaling and the scheduling indication information included in the bit fields associated with the terminals within the downlink control information DCI; wherein N is the positive integer greater than or equal to 1;

a first determination module 72 is used for determining the group of target scheduling information from the N groups of the scheduling information according to the scheduling indication information;

and a second processing module 73 is used for and performing data transmission or obtaining that the scheduling is not performed according to the target scheduling information.

The scheduling apparatus provided by the embodiment of the disclosure, including: receiving the N groups of the scheduling information configured by the first high layer signaling and scheduling indication information included in the bit field related to the terminal in the downlink control information DCI; wherein the N is a positive integer greater than or equal to 1; determining a group of target scheduling information from the N groups of scheduling information according to the scheduling indication information; performing data transmission or obtaining that the scheduling is not performed according to the target scheduling information; the scheduling the data transmission of at least one terminal through the downlink control information (DCI) by means of combining high layer signaling pre-configuration and group common downlink control channel; that is, the base station configures scheduling information through the higher layer signaling, and then notifies the terminal of the corresponding scheduling information through the UE-specific bit field in the DCI; so that the resource overhead of the downlink control channels can be reduced, the collision probability among the downlink control channels of different terminals can be reduced, and the transmission delay can be reduced.

Wherein, each group of the scheduling information includes the complete information for scheduling; or each group of scheduling information includes incomplete information for scheduling in the complete information for scheduling, and the residual scheduling information are determined in a predefined manner or configured in advance through second higher layer signaling or dynamically indicated through physical layer signaling.

Each group of scheduling information is different from each other.

Specifically, the first receiving module comprises a fourth processing submodule, which is used for receiving the N groups of scheduling information configured by the first high layer signaling, wherein the scheduling information includes the DCI of bit fields related to the Z terminals, and the indexes of the scheduling indication information for the terminal data scheduling, which is indicated through the third high layer signaling, in the bit fields in the DCI; wherein Z is a positive integer greater than or equal to 1 and less than or equal to the Y; the Y is the total number of terminals configured with N groups of scheduling information by the base station; and wherein, Z is the positive integer greater than or equal to 1 and less than or equal to Y; and Y is the total number of terminals configured with the N groups of scheduling information by the base station.

In another aspect, the first receiving module includes: a fifth processing submodule, which is used for obtaining the scheduling indication information for scheduling the terminal data in the corresponding bit field in the DCI according to the index of the bit field indicated by the third high layer signaling.

Specifically, the first receiving module includes a sixth processing sub-module, which is used for detecting and receiving the DCI including the scheduling indication information of the Z terminals according to the PDCCH monitoring occasion configured by the base station; wherein the Z is the positive integer greater than or equal to 1 and less than or equal to Y; and Y is the total number of terminals configured with N groups of scheduling information by the base station.

In the embodiment of the invention, the format of the DCI is a currently defined downlink control information format DCI format, or a DCI format newly added for Z terminal scheduling; wherein Z is a positive integer greater than or equal to 1 and less than or equal to Y; Y is the total number of terminals configured with N groups of scheduling information by the base station.

Wherein, the embodiments of the scheduling method of the terminal side are suitable for the embodiment of the scheduling device, and the same technical effect can be achieved.

It should be noted that many of the features described in this specification are referred to as modules/sub-modules in order to more particularly emphasize the independence of their implementation.

In the embodiment of the disclosure, the modules/sub-modules may be implemented in software for execution by various types of processors. For example, an identified executable code module may include one or more physical or logical blocks of the computer instructions, which may be implemented, for example, as objects, processes or functions. Nevertheless, the executable code of the identified modules need not be physically located together, but may include different instructions stored in different bits that, when joined logically together, and make up a module and achieve the specified purpose of the module.

Indeed, a module of executable code may be a single instruction or many instructions, and may even be distributed over many different code segments, among different programs, and across multiple memory devices. Similarly, operational data may be identified within modules and may be implemented in any suitable form and organized within any suitable type of data structure. The operational data may be collected as a single data set or may be distributed over different locations, including on different storage devices, and may exist, at least in part, merely as electronic signals on a system or network.

When a module can be implemented using the software, a person skilled in the art would be able to construct a corresponding hardware circuit to realize a corresponding function under the condition that the cost is not taken into account, and the hardware circuit includes a conventional very large scale integration (VLSI) circuit or a gate array and such as a logic chip, considering the level of a hardware process in the related art, related art semiconductors such as transistors or other discrete components. The modules may also be implemented with programmable hardware devices, such as the field programmable gate arrays, the programmable array logic, and the programmable logic devices, etc.

While the foregoing is directed to alternative embodiments of the present disclosure, it will be apparent to those skilled in the art that various modifications and variations can be made in the present disclosure without departing from the principles of the disclosure.

What is claimed is:

1. A scheduling method performed by a base station, the scheduling method comprising:
scheduling data transmission of at least one terminal through downlink control information (DCI) by means of combining high layer signaling pre-configuration and group common downlink control channels,
wherein the data transmission of the at least one terminal is transmitted by using a downlink control information format, DCI format having a payload size of the DCI format the same as the payload size of DCI format 0-0 or DCI format 1-0,
wherein the scheduling the data transmission of at least one terminal through the DCI by means of combining high layer signaling pre-configuration and group common downlink control channel comprises:
configuring N groups of scheduling information respectively for Y terminals in advance through different first high layer signaling, and sending the scheduling information to corresponding terminals respectively, wherein Y is a positive integer greater than or equal to 1, N is a positive integer greater than or equal to 1, and the first high layer signaling corresponding to different terminals is different; and
transmitting the DCI carried by the downlink control channel to Z terminals in a common search space, wherein the DCI includes the bit fields respectively related to the Z terminals, wherein the scheduling indication information in each bit field indicates that the corresponding terminal transmits data according to one of the received N groups of scheduling information or indicates that the terminal is not scheduled; wherein Z is a positive integer greater than or equal to 1 and less than or equal to Y.

2. The scheduling method according to claim 1, wherein each group of the scheduling information comprises complete information for scheduling; or
each group of scheduling information includes incomplete information for scheduling in the complete information for scheduling, and the residual scheduling information are determined in a predefined manner or configured in advance through second higher layer signaling or dynamically indicated through physical layer signaling.

3. The scheduling method according to claim 1, wherein each group of the scheduling information is different from each other.

4. The scheduling method according to claim 1, wherein the scheduling the data transmission of at least one terminal through the downlink control information (DCI) by means of combining high layer signaling pre-configuration and group common downlink control channel further comprises:
configuring index of the information bit used for corresponding terminal data scheduling in the DCI through different third high layer signaling respectively; and
wherein the third higher layer signaling corresponding to different terminals is different.

5. The scheduling method according to claim 1, wherein the periodicity of the common search space is less than one time slot.

6. The scheduling method according to claim 1, wherein the DCI is transmitted by reusing currently defined downlink control information format (DCI format) or using a newly added DCI format.

7. The scheduling method according to claim 6, wherein if the currently defined DCI format is reused, the base station indicates that one currently defined DCI format is used for transmitting the scheduling information of the Z terminals through a predetermined flag, and the bit field of the Z terminals is comprised in the DCI format;
wherein the predetermined flag is a value of a different radio network temporary identifier (RNTI) used for scrambling a cyclic redundancy check (CRC), or indication information carried on frozen bits, or an explicit indication bit field included in the DCI, or a predetermined bit field included in the DCI and configured to a predetermined value, or an index of a predetermined search space for transmitting the DCI.

8. The scheduling method according to claim 6, wherein if the newly added DCI format is adopted, the DCI format comprises the bit fields of the Z terminals, and each bit field is used for scheduling the predetermined terminal;
a relationship between the bit field and the predetermined terminal is determined by the bit field index indicated by the third higher layer signaling; and
a payload size of the DCI format is the same as a payload size of DCI format 0-0 or DCI format 1-0 determined according to an initial band width part (BWP).

9. The scheduling method according to claim 1, wherein a number M of the bit fields comprised in the DCI is determined according to the X bits in the DCI that is used for transmitting the scheduling indication information and the length L of each bit field, M=Floor (X/L), wherein X is a positive number greater than 0, and L is a positive number greater than 0.

10. The scheduling method according to claim 1, wherein the length of each bit field in the DCI is determined according to the number of the scheduling information; wherein,
if each group of scheduling information comprises complete information for scheduling, N kinds of different scheduling information are configured;
then the length of each bit field in the DCI is ceil (log 2(N)) bits or ceil (log 2(N+1)) bits; or
if each group of scheduling information comprises incomplete information for scheduling in the complete information for scheduling, then the bit field in the DCI indicates the scheduling information configured by the first higher layer signaling, and dynamically indicates the residual scheduling information;
wherein the residual scheduling information is information which is not included by each group of scheduling information.

11. A scheduling method performed by a terminal, the scheduling method comprising:
receiving N groups of scheduling information configured by first high layer signaling and scheduling indication information included in a bit field related to the terminal in downlink control information (DCI); wherein N is a positive integer greater than or equal to 1;
determining a group of target scheduling information from the N groups of scheduling information according to the scheduling indication information; and
performing data transmission or indicating that the scheduling is not performed according to the target scheduling information,
wherein the scheduling indication information is transmitted by using a downlink control information format, DCI format having a payload size of the DCI format the same as the payload size of DCI format 0-0 or DCI format 1-0,
wherein the receiving the N groups of the scheduling information configured by the first high layer signaling and the scheduling indication information comprised in the bit field related to the terminal in the DCI comprises:
receiving the N groups of scheduling information configured by the first high layer signaling, the DCI of bit fields related to the Z terminals, and indexes of the scheduling indication information for the terminal data scheduling in the DCI, which are indicated through the third high layer signaling;
wherein Z is a positive integer greater than or equal to 1 and less than or equal to Y; Y is a total number of terminals configured with the N groups of scheduling information by the base station.

12. The scheduling method according to claim 11, wherein each group of scheduling information comprises complete information for scheduling; or
each group of scheduling information includes incomplete information for scheduling in the complete information for scheduling, and residual scheduling information are determined in a predefined manner or configured in advance through second higher layer signaling or dynamically indicated through physical layer signaling.

13. The scheduling method according to claim 11, wherein each group of scheduling information is different from each other.

14. The scheduling method according to claim 11, wherein the receiving the N groups of the scheduling information configured by the first high layer signaling and scheduling indication information included in the bit field related to the terminal in the downlink control information (DCI) comprises:
obtaining the bit field used for corresponding terminal data scheduling in the DCI according to the index of the bit field configured by the third higher layer signaling.

15. The scheduling method according to claim 13, wherein the receiving the N groups of the scheduling information configured by the first high layer signaling and scheduling indication information included in the bit field related to the terminal in the downlink control information (DCI) comprises:
detecting and receiving the DCI including the scheduling indication information of the Z terminals according to physical downlink control channel (PDCCH) monitoring occasion configured by the base station;
wherein Z is a positive integer greater than or equal to 1 and less than or equal to Y; Y is the total number of terminals configured with the N groups of scheduling information by the base station.

16. The scheduling method according to claim 11, wherein the format of the DCI is a currently defined downlink control information format (DCI format), or the DCI format added for the scheduling of the Z terminals; and
wherein Z is a positive integer greater than or equal to 1 and less than or equal to Y; Y is the total number of terminals configured with the N groups of scheduling information by the base station.

17. A base station comprising a memory, a processor, and a computer program stored on the memory and operable on the processor; wherein the processor implements steps of the scheduling method according to claim 1 when executing the program.

18. A terminal comprising a memory, a processor, a transceiver, and a computer program stored on the memory and operable on the processor; wherein the processor implements the following steps when executing the program:

receiving N groups of scheduling information configured by first high layer signaling and scheduling indication information included in an bit field related to the terminal in downlink control information (DCI) by the transceiver; wherein N is a positive integer greater than or equal to 1;

determining a group of target scheduling information from the N groups of scheduling information according to the scheduling indication information; and performing data transmission or indicating that the scheduling is not performed according to the target scheduling information, wherein the scheduling indication information is transmitted by using a downlink control information format, DCI format having a payload size of the DCI format the same as the payload size of DCI format 0-0 or DCI format 1-0, wherein the receiving the N groups of the scheduling information configured by the first high layer signaling and the scheduling indication information comprised in the bit field related to the terminal in the DCI comprises:

receiving the N groups of scheduling information configured by the first high layer signaling, the DCI of bit fields related to the Z terminals, and indexes of the scheduling indication information for the terminal data scheduling in the DCI, which are indicated through the third high layer signaling;

wherein Z is a positive integer greater than or equal to 1 and less than or equal to Y; Y is a total number of terminals configured with the N groups of scheduling information by the base station.

* * * * *